US008336032B2

(12) United States Patent
Bates

(10) Patent No.: US 8,336,032 B2
(45) Date of Patent: Dec. 18, 2012

(54) IMPLEMENTING ENHANCED TEMPLATE DEBUG

(75) Inventor: Cary Lee Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1412 days.

(21) Appl. No.: 11/950,569

(22) Filed: Dec. 5, 2007

(65) Prior Publication Data

US 2009/0150870 A1    Jun. 11, 2009

(51) Int. Cl.
*G06F 9/44* (2006.01)
(52) U.S. Cl. ...................................................... 717/129
(58) Field of Classification Search .................... 717/129
See application file for complete search history.

(56) References Cited

U.S. PATENT DOCUMENTS

| | | | |
|---|---|---|---|
| 6,412,106 B1 * | 6/2002 | Leask et al. .................... | 717/124 |
| 7,178,135 B2 | 2/2007 | Bates et al. | |
| 7,251,808 B2 | 7/2007 | Bates et al. | |
| 2003/0217354 A1 | 11/2003 | Bates et al. | |
| 2004/0117769 A1 * | 6/2004 | Lauzon et al. ................. | 717/125 |
| 2005/0060689 A1 | 3/2005 | Bates et al. | |
| 2006/0041867 A1 | 2/2006 | Bates et al. | |

OTHER PUBLICATIONS

Using HP C++ for Tru64 UNIX and Linux Alpha, Chapter 9, Using the Ladebug Debugger, Hewlett-Packard Development Company, L.P., 2007.
C and C++ SoftBench User's Guide, Chapter 7, Using SoftBench Debugger, Hewlett-Packard Development Company, L.P., 2007.
Debugging a Program With dbx, Chapter 15, Debugging C++ With dbx, Sun Microsystems, Inc, 2005.
"C++ Templates Tutorial", Microsoft Corporation, 1997, pp. 1-15. (Retrieved Oct. 14, 2011, from http://www.iis.sinica.edu.tw/~kathy/vcstl/templates.htm).

* cited by examiner

*Primary Examiner* — Li B Zhen
*Assistant Examiner* — Bradford Wheaton
(74) *Attorney, Agent, or Firm* — Matthew J. Bussan

(57) ABSTRACT

A template debug mechanism is provided for executing an operation on at least one breakpoint within a program that includes a template. In one embodiment, in response to a first selection, a breakpoint is set in all expansions of the template and a multiple breakpoints icon is displayed. Preferably, the user may request display of a breakpoint properties dialog box listing each of the template expansions in which the multiple breakpoints are set. In response to a second selection, a breakpoint is set in only the current expansion of the template that is active in the call stack, and a single breakpoint icon is displayed. In response to the third selection, any breakpoint set in any expansion of the template is removed. Preferably, the first, second and third selections are respectively made by the user with a first, second and third click of an input device.

12 Claims, 7 Drawing Sheets

IMPLEMENTING ENHANCED TEMPLATE DEBUG

BACKGROUND OF THE INVENTION

1. Field of Invention

The present invention relates in general to the digital data processing field and, in particular, to debugger programs. More particularly, the present invention relates to a mechanism for implementing enhanced graphical user interface functions in a graphical debugger for debugging programs with templates.

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

A modern computer system typically comprises at least one central processing unit (CPU) and supporting hardware, such as communications buses and memory, necessary to store, retrieve and transfer information. It also includes hardware necessary to communicate with the outside world, such as input/output controllers or storage controllers, and devices attached thereto such as keyboards, monitors, tape drives, disk drives, communication lines coupled to a network, etc. The CPU or CPUs are the heart of the system. They execute the instructions which comprise a computer program and direct the operation of the other system components.

The overall speed of a computer system is typically improved by increasing parallelism, and specifically, by employing multiple CPUs (also referred to as processors). The modest cost of individual processors packaged on integrated circuit chips has made multiprocessor systems practical, although such multiple processors add more layers of complexity to a system.

From the standpoint of the computer's hardware, most systems operate in fundamentally the same manner. Processors are capable of performing very simple operations, such as arithmetic, logical comparisons, and movement of data from one location to another. But each operation is performed very quickly. Sophisticated software at multiple levels directs a computer to perform massive numbers of these simple operations, enabling the computer to perform complex tasks. What is perceived by the user as a new or improved capability of a computer system is made possible by performing essentially the same set of very simple operations, using software having enhanced function, along with faster hardware.

A programmer develops a software program by producing and entering source code into files using a text editor program. The computer then creates an executable program by translating the source code into machine code. The machine code is the rudimentary instructions understood by the computer. Illustratively, the foregoing software development process is accomplished by running a series of programs. These programs include a compiler for translating the source code into machine code and a linker to link the machine code together to form a program.

An important aspect of the design and development of a computer program is a process known as "debugging". Debugging involves testing and evaluating the software to find and correct any errors and improper logic operations. Typically, a programmer uses another computer program commonly known as a debugger to debug a program under development. An effective debugger program is necessary for rapid and efficient development of software and typically provides functions including breakpoints, run-to-cursor, step into, step over, and the like.

A conventional debugging system comprises a combination of computer hardware and debugger software that executes a user's program in a controlled manner. Debugging aids a user in identifying and correcting mistakes in an authored program by allowing the program to be executed in small segments. This approach is enabled primarily by two operations: step functions and breakpoints.

A "step" function permits a computer programmer to process instructions (also known as "statements") in a computer program one-by-one, and see the results upon completion of each instruction. While the step operation provides the programmer with a large amount of information about a program during its execution, stepping through hundreds or thousands of program instructions can be extremely tedious and time consuming, and may require a programmer to step through many program instructions that are known to be error-free before a set of instructions to be analyzed are executed.

To address this difficulty, conventional debuggers utilize a breakpoint operation, which permits a computer programmer to identify, with a "breakpoint", a precise instruction for which it is desired to halt execution of a computer program during execution. As a result, when a computer program is executed by a debugger, the program executes in a normal fashion until a breakpoint is reached, and then stops execution and displays the results of the computer program to the programmer for analysis.

Some conventional debuggers support non-conditional breakpoints where the execution of the program is always halted upon reaching the breakpoint. Other conventional debuggers support conditional breakpoints that halt the execution of a program only when a predetermined value, i.e., a condition, is obtained when the breakpoint is encountered.

Breakpoints that are set within a scope typically share common attributes. Thus, if one breakpoint is encountered, the rest of the breakpoints are also encountered. While debugging code within the scope, a user frequently executes an operation, such as a disable operation or an enable operation, on the breakpoints within the scope. If the user desires to execute the same operation on all the breakpoints within the scope, the user would have to execute the same operation on each individual breakpoint within the scope. Individually executing the same operation on each breakpoint within the same scope can be tedious and cumbersome, particularly if the number of breakpoints within the scope is significant.

In order to address this difficulty, it is known to provide conventional debugging systems with a mechanism for simultaneously executing the same operation on the breakpoints within the same scope. For example, U.S. Pat. No. 7,178,135, entitled "SCOPE-BASED BREAKPOINT SELECTION AND OPERATION", which issued on Feb. 13, 2007 to Bates et al. and is assigned to International Business Machines Corporation, discloses a mechanism for executing the same operation, such as an enabling operation, a disabling operation, or a removing operation, on all the breakpoints within a selected scope. In accordance with that patent's disclosure, breakpoints are indicated as being set on a user interface screen by black arrows proximate lines on one or more panels, such as a breakpoint panel or a source code panel. In the disable operation, all of the breakpoints within a selected scope are disabled and the black arrows proximate each position at which the breakpoint is set are changed to white arrows. In the remove operation, all of the breakpoints within a selected scope are removed from the selected scope and the black arrows proximate each position at which the breakpoint is set are removed.

It is advantageous in the development of software programs to use type parameterization, more commonly referred to as "templates". For example, C++ templates allow a programmer to implement generic constructs (e.g., vectors, stacks, lists, queues, etc.) that can be used with any arbitrary type. Accordingly, C++ templates advantageously provide a way to re-use source code.

C++ templates offer an interesting challenge to debuggers. With a C++ template, the source code for a single template method may expand into many different methods. The user may intend to set a breakpoint in all the template expansions or just a particular expansion of the template.

In a conventional debugger, when debugging a program with templates, setting a breakpoint using a source code view typically results in a breakpoint being set on all template expansions. Thus, execution of the program will halt whenever that line of source code is encountered. The problem is that, for templates, setting a breakpoint using a source code view often leads to an excessive amount of debug stops, and at each of these debug stops the user must attempt to determine the expansion of the template in which the program is stopped. Typically, the user is not interested in most of the debug stops and, hence, a good deal of the user's time may be wasted.

Also in a conventional debugger, a user may set a breakpoint in a single template expansion using a statement view or an assembly view. The problem is that setting a breakpoint in a single template expansion using a statement view or an assembly view is not easily accomplished. The statement view typically contains procedure names and statement numbers, not source code. Hence, the user must try to locate the procedure(s) and statement(s) that are associated with the correct template expansion. The user may find this confusing and time consuming. The assembly view typically contains assembly code, and the user must try to locate the assembly code associated with the correct template expansion. Again, the user may find this confusing and time consuming.

Therefore, a need exists for an improved debugger having a mechanism when debugging programs with templates to provide enhanced template debug.

SUMMARY OF THE INVENTION

According to the preferred embodiments of the present invention, a template debug mechanism is provided for executing an operation on at least one breakpoint within a program that includes a template. In one embodiment, in response to a first selection, a breakpoint is set in all expansions of the template and a multiple breakpoints icon is displayed. The multiple breakpoints icon gives the user notice that the breakpoint will fire in multiple template expansions. Preferably, the user may request display of a breakpoint properties dialog box listing the expansions in which the multiple breakpoints are set. In response to a second selection, a breakpoint is set in only the current expansion of the template that is active in the call stack, and a single breakpoint icon is displayed. In response to the third selection, any breakpoint set in any expansion of the template is removed. Preferably, the first, second and third selections are respectively made by the user with a first, second and third click of an input device.

The foregoing and other features and advantages of the invention will be apparent from the following more particular description of the preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements.

DETAILED DESCRIPTION OF THE PREFERRED EMBODIMENTS 1.0 Overview

In accordance with the preferred embodiments of the present invention, a template debug mechanism is provided for executing an operation on at least one breakpoint within a program that includes a template. In response to a first selection, a breakpoint is set in all expansions of the template and a multiple breakpoints icon is displayed. The multiple breakpoints icon gives the user notice that the breakpoint will fire in multiple template expansions. Preferably, the user may request display of a breakpoint properties dialog box listing the expansions in which the multiple breakpoints are set. In response to a second selection, a breakpoint is set in only the current expansion of the template that is active in the call stack, and a single breakpoint icon is displayed. In response to the third selection, any breakpoint set in any expansion of the template is removed. Preferably, the first, second and third selections are respectively made by the user with a first, second and third click of an input device.

2.0 Detailed Description

Figure 1:
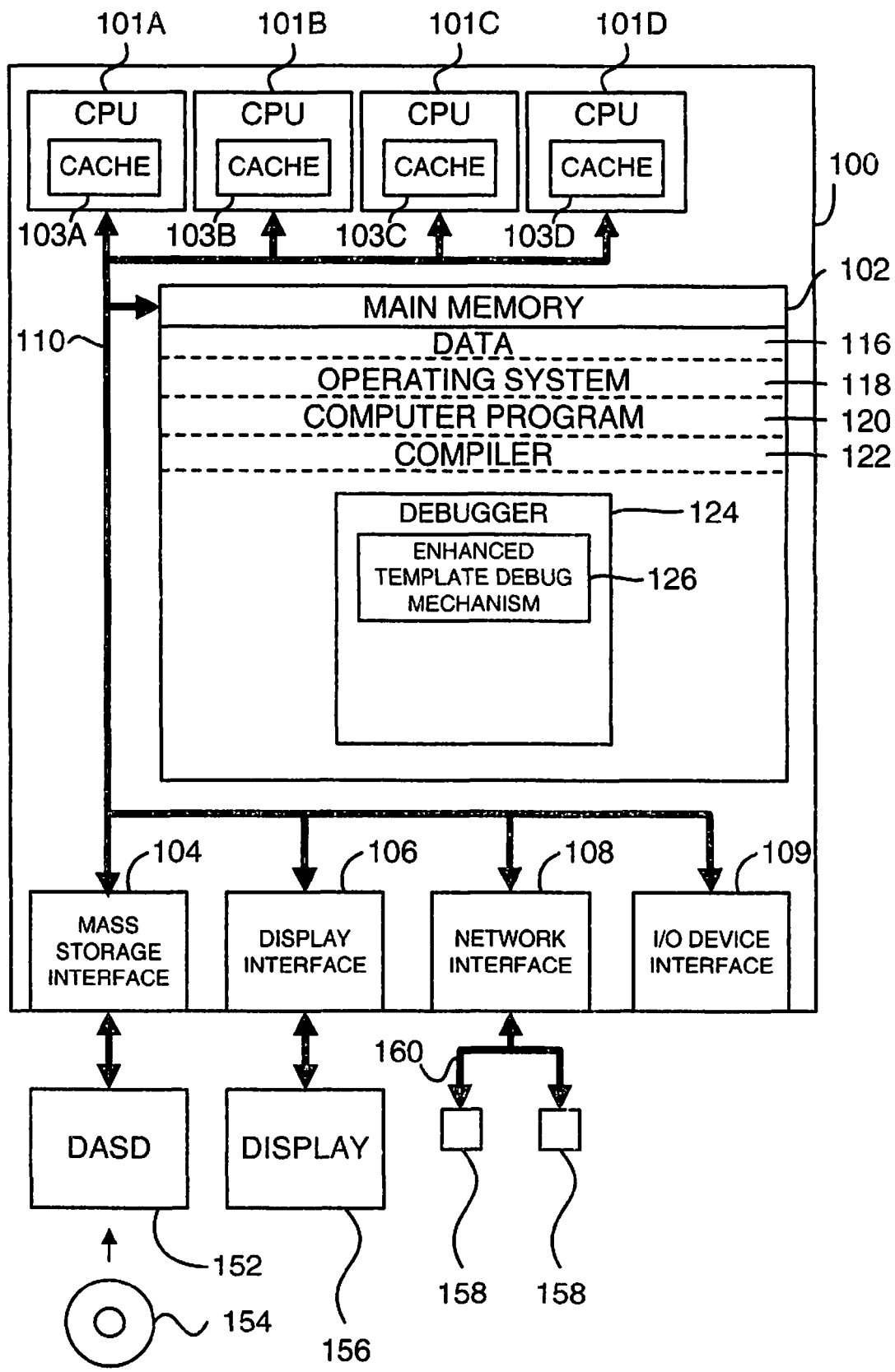
FIG. 1 is a block diagram illustrating a computer apparatus for implementing enhanced template debug in accordance with the preferred embodiments of the present invention.

A computer system implementation of the preferred embodiments of the present invention will now be described with reference to FIG. 1 in the context of a particular computer system 100, i.e., an IBM eServer iSeries or System i computer system. However, those skilled in the art will appreciate that the method, apparatus, and computer program product of the present invention apply equally to any computer system, regardless of whether the computer system is a complicated multi-user computing apparatus, a single user workstation, a PC, or an embedded control system. As shown in FIG. 1, computer system 100 comprises a one or more processors 101A, 101B, 101C and 101D, a main memory 102, a mass storage interface 104, a display interface 106, a network interface 108, and an I/O device interface 109. These system components are interconnected through the use of a system bus 110.

FIG. 1 is intended to depict the representative major components of computer system 100 at a high level, it being understood that individual components may have greater complexity than represented in FIG. 1, and that the number, type and configuration of such components may vary. For example, computer system 100 may contain a different number of processors than shown.

Processors 101A, 101B, 101C and 101D (also collectively referred to herein as "processors 101") process instructions and data from main memory 102. Processors 101 temporarily hold instructions and data in a cache structure for more rapid access. In the embodiment shown in FIG. 1, the cache structure comprises caches 103A, 103B, 103C and 103D (also collectively referred to herein as "caches 103") each associated with a respective one of processors 101A, 101B, 101C and 101D. For example, each of the caches 103 may include a separate internal level one instruction cache (L1 I-cache) and level one data cache (L1 D-cache), and level two cache (L2 cache) closely coupled to a respective one of processors 101. However, it should be understood that the cache structure may be different; that the number of levels and division of function in the cache may vary; and that the system might in fact have no cache at all.

Main memory 102 in accordance with the preferred embodiments contains data 116, an operating system 118 and application software, utilities and other types of software. In addition, main memory 102 includes a computer program 120, a compiler 122, a debugger program (also referred to as a "debugger") 124, and an enhanced template debug mechanism 126, each of which may in various embodiments exist in any number. The computer program 120 represents any code that is to be examined, edited, compiled and/or debugged. In one embodiment, the debugger 124 is a graphical user interface system debugger for the IBM eServer iSeries or System i computer system.

Although the computer program 120, the compiler 122, the debugger 124 and the enhanced template debug mechanism 126 are illustrated as being contained within the main memory 102, in other embodiments some or all of them may be on different electronic devices and may be accessed remotely (e.g., via the network 160). Thus, for example, the debugger 124 may be located on a networked device (e.g., the computer system and/or workstation 158), while the computer program 120 to be debugged is on the computer system 100.

In the preferred embodiments of the present invention, the enhanced template debug mechanism 126 includes instructions capable of executing on the processors 101 or statements capable of being interpreted by instructions executing on the processors 101 to perform the functions as further described below with reference to FIGS. 2-7. In another embodiment, the enhanced template debug mechanism 126 may be implemented in hardware via logic gates and/or other appropriate hardware techniques in lieu of, or in addition to, a processor-based system.

While the enhanced template debug mechanism 126 is shown as a component of the debugger program 124 in FIG. 1, the preferred embodiments expressly extend to the enhanced template debug mechanism 126 being implemented within the operating system 118 or application software, utilities, or other types of software within the scope of the preferred embodiments.

Computer system 100 utilizes well known virtual addressing mechanisms that allow the programs of computer system 100 to behave as if they have access to a large, single storage entity instead of access to multiple, smaller storage entities such as main memory 102 and DASD device 152. Therefore, while data 116, operating system 118, computer program 120, compiler 122, debugger 124 and enhanced template debug mechanism 126, are shown to reside in main memory 102, those skilled in the art will recognize that these items are not necessarily all completely contained in main memory 102 at the same time. It should also be noted that the term "memory" is used herein to generically refer to the entire virtual memory of the computer system 100.

Data 116 represents any data that serves as input to or output from any program in computer system 100. Operating system 118 is a multitasking operating system known in the industry as OS/400 or IBM i5/OS; however, those skilled in the art will appreciate that the spirit and scope of the present invention is not limited to any one operating system.

Processors 101 may be constructed from one or more microprocessors and/or integrated circuits. Processors 101 execute program instructions stored in main memory 102. Main memory 102 stores programs and data that may be accessed by processors 101. When computer system 100 starts up, processors 101 initially execute the program instructions that make up operating system 118. Operating system 118 is a sophisticated program that manages the resources of computer system 100. Some of these resources are processors 101, main memory 102, mass storage interface 104, display interface 106, network interface 108, I/O device interface 109 and system bus 110.

Although computer system 100 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load compute-intensive processing from processors 101. However, those skilled in the art will appreciate that the present invention applies equally to computer systems that simply use I/O adapters to perform similar functions.

Mass storage interface 104 is used to connect mass storage devices (such as a direct access storage device 152) to computer system 100. One specific type of direct access storage device 152 is a readable and writable CD ROM drive, which may store data to and read data from a CD ROM 154.

Display interface 106 is used to directly connect one or more displays 156 to computer system 100. These displays 156, which may be non-intelligent (i.e., dumb) terminals or fully programmable workstations, are used to allow system administrators and users (also referred to herein as "operators" and "developers") to communicate with computer system 100. Note, however, that while display interface 106 is provided to support communication with one or more displays 156, computer system 100 does not necessarily require a display 156, because all needed interaction with users and processes may occur via network interface 108.

Network interface 108 is used to connect other computer systems and/or workstations 158 to computer system 100 across a network 160. The present invention applies equally no matter how computer system 100 may be connected to other computer systems and/or workstations, regardless of whether the network connection 160 is made using present-day analog and/or digital techniques or via some networking mechanism of the future. In addition, many different network protocols can be used to implement a network. These protocols are specialized computer programs that allow computers to communicate across network 160. TCP/IP (Transmission Control Protocol/Internet Protocol) is an example of a suitable network protocol.

The I/O device interface 109 provides an interface to any of various input/output devices.

At this point, it is important to note that while this embodiment of the present invention has been and will be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROMs (e.g., CD ROM 154 of FIG. 1), and transmission type media such as digital and analog communications links (e.g., network 160 in FIG. 1).

Figure 2:
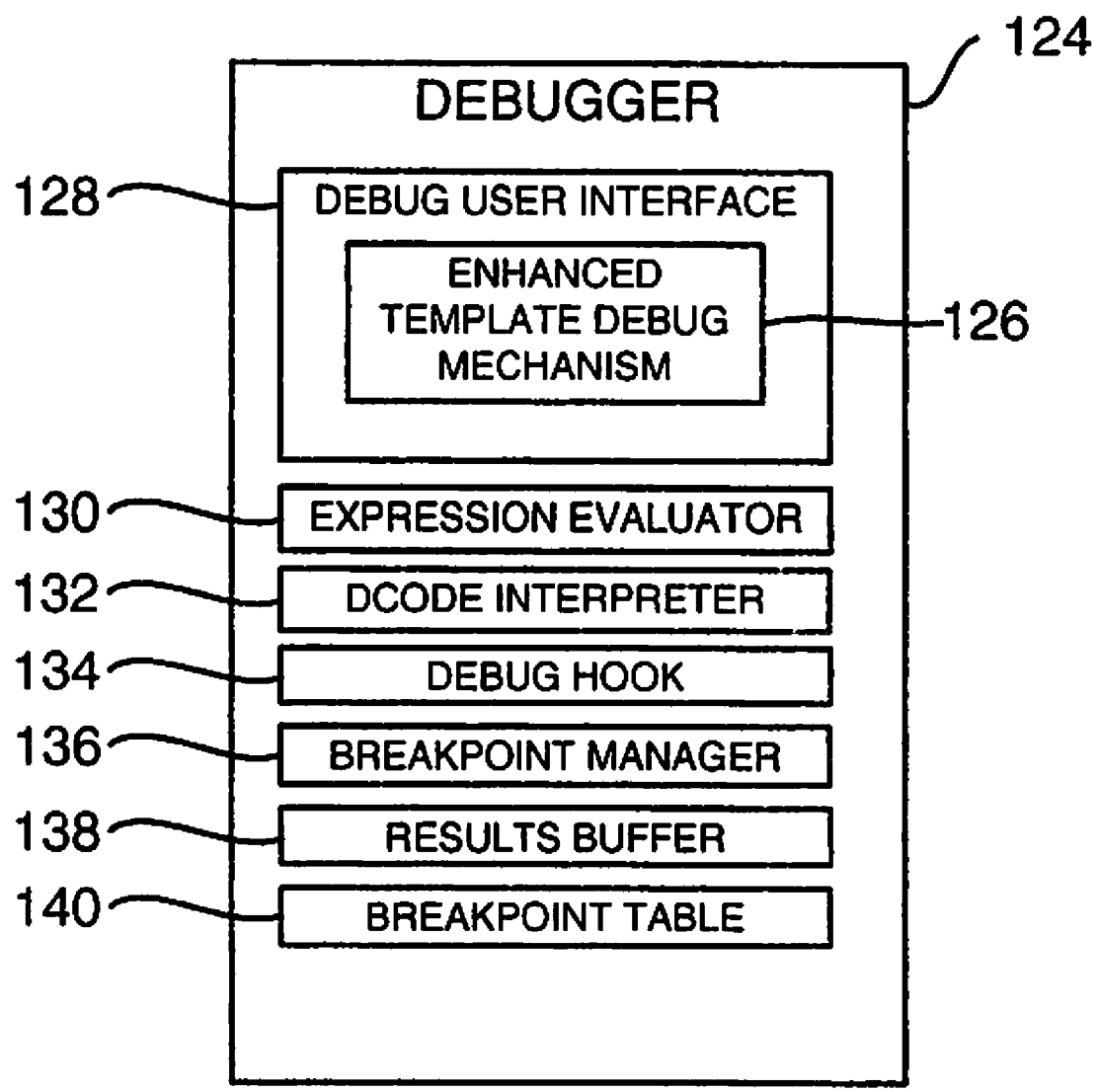
FIG. 2 is a block diagram illustrating a debugger for implementing enhanced template debug in accordance with the preferred embodiments of the present invention.

A specific embodiment of a debugger for implementing enhanced template debug in accordance with the preferred embodiments of the present invention is now described with reference to FIG. 2. The specific embodiment shown in FIG. 2 is a more detailed illustration of the debugger 124 shown in FIG. 1. In the specific embodiment, the debugger 124 comprises a debugger user interface 128 (shown as containing the enhanced template debug mechanism 126), an expression evaluator 130, a Dcode interpreter (also referred to as a "debug interpreter") 132, a debugger hook (also referred to as a "stop handler") 134, a breakpoint manager 136, a results buffer 138, and a breakpoint table 140. Although treated herein as integral parts of the debugger 124, one or more of the foregoing components may exist separately in the computer system 100. Further, the debugger may include additional components not shown or may omit components shown.

Although the enhanced template debug mechanism 126 is illustrated in the specific embodiment shown in FIG. 2 as being contained within the debug user interface 128, in other embodiments the enhanced template debug mechanism 126 may be contained within one or more other components of the debugger 124 or elsewhere.

Figure 3:
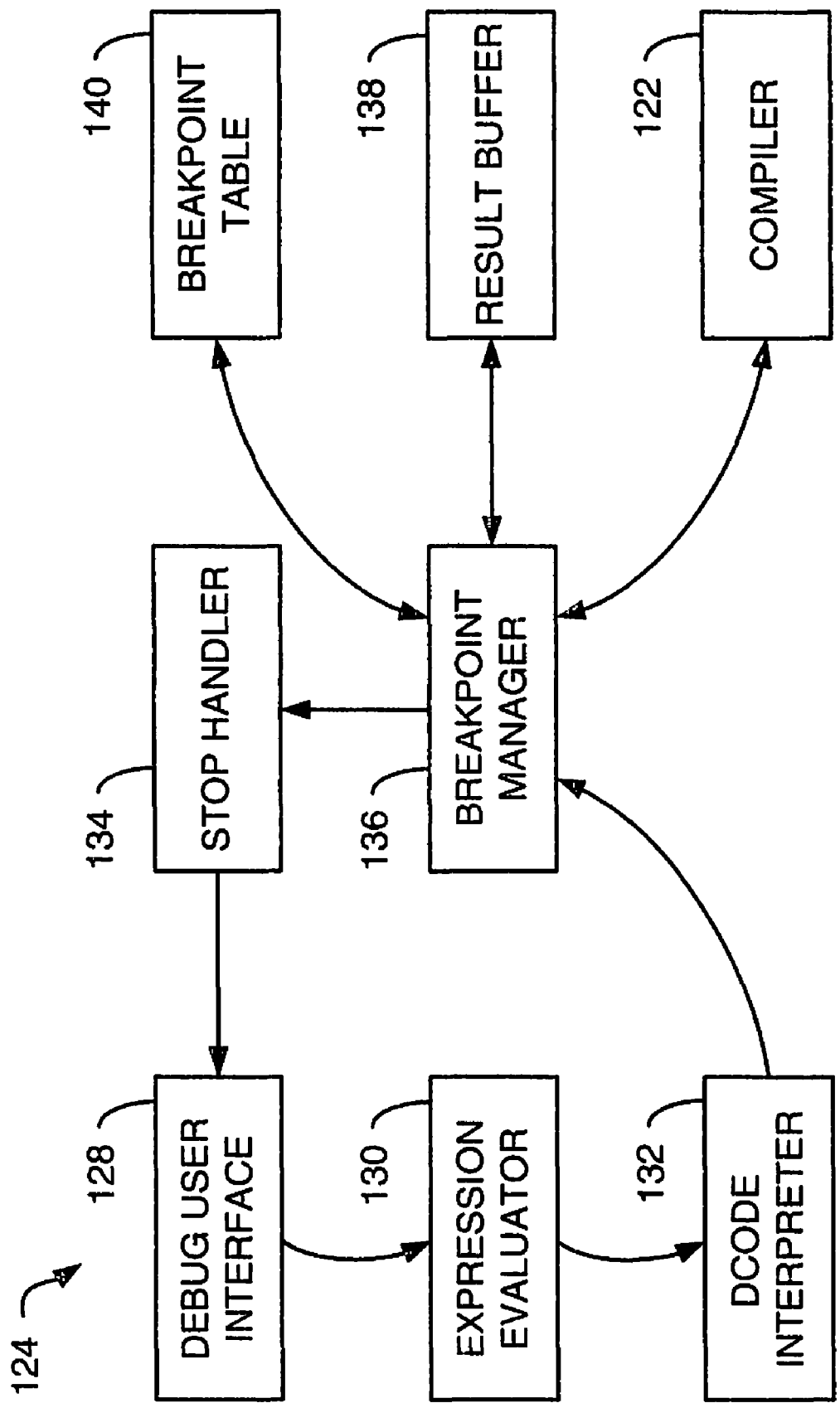
FIG. 3 is a block diagram illustrating the operation of a debugger in accordance with the preferred embodiments of the present invention.

An illustrative debugging process in accordance with the preferred embodiments of the present invention is now described with reference to FIG. 3. A debugging process is initiated by the debug user interface 128. The user interface 128 presents the program under debugging and typically highlights the current line of the program on which a stop or error occurs. The user interface 128 allows the user to set control points (e.g., breakpoints and watch points) with a different toggling pattern for debugging a program with a template as compared to a program without a template, display and change variable values, display and change breakpoint icons (e.g., a multiple breakpoints icon and a single breakpoint icon) and activate other inventive features described herein by inputting the appropriate commands. In some instances, the user may define the commands by referring to high-order language (HOL) references such as line or statement numbers or software object references such as a program or module name, from which the physical memory address may be cross-referenced.

For debugging a program without a template, a conventional toggling pattern is used. For example, a single click of an input device (e.g., mouse, TrackPoint, or the like) by the user sets a breakpoint and a breakpoint icon is displayed, and another single click of the input device removes the breakpoint and the icon. Toggling may also be accomplished using a context menu dialog box. Such a scheme is disclosed in U.S. Pat. No. 7,178,135, entitled "SCOPE-BASED BREAKPOINT SELECTION AND OPERATION", which issued on Feb. 13, 2007 to Bates et al. and is assigned to International Business Machines Corporation. U.S. Pat. No. 7,178,135 is hereby incorporated herein by reference in its entirety.

For debugging a program with a template, an enhanced toggling pattern is used in accordance with the preferred embodiments of the present invention. For templates, a first click of the input device by the user sets a breakpoint in all expansions, a second click of the input device removes the breakpoints set in response to the first click and sets a breakpoint in only the current expansion that is active on the call stack, and a third click of the input device removes the breakpoint set in response to the second click.

In accordance with the preferred embodiments of the present invention, an enhanced icon display is used in addition to the enhanced toggling pattern. For templates, a multiple breakpoints icon is displayed in response to the first click of the input device by the user. The multiple breakpoints icon gives the user notice that the breakpoint will fire on multiple template expansions. A breakpoint properties dialog box may be displayed listing each of the template expansions in which the multiple breakpoints are set. In response to the second click of the input device, the multiple breakpoints icon is removed from display and a single breakpoint icon is displayed. In response to the third click of the input device, the single breakpoint icon is removed from display.

The expression evaluator 130 parses the debugger command passed from the debug user interface 128 and uses a data structure (e.g., a table) generated by the compiler 122 to map the line number in the debugger command to the physical memory address in the memory 102. In addition, the expression evaluator 130 generates a Dcode program for the command. The Dcode program is machine executable language that emulates the commands. Some embodiments of the invention include Dcodes which, when executed, activate control features described in more detail below.

The Dcode generated by the expression evaluator 130 is executed by the Dcode interpreter 132. The Dcode interpreter 132 handles expressions and Dcode instructions to perform various debugging steps. Results from Dcode interpreter 132 are returned to the debug user interface 128 through the expression evaluator 130. In addition, the Dcode interpreter 132 passes on information to the stop handler 134, which takes steps described below.

After the commands are entered, the user provides an input that resumes execution of the computer program 120. During execution, control is returned to the debugger 124 via the stop handler 134. The stop handler 134 is a code segment that returns control to the appropriate user interface. In some implementations, execution of the computer program 120 eventually results in an event causing a trap to fire (e.g., a breakpoint or watch point is encountered). Inserting and managing special op codes that cause these traps to fire is the responsibility of the breakpoint manager 136. When a trap fires, control is then returned to the debugger 124 by the stop handler 134 and execution of the computer program 120 is halted. The stop handler 134 then invokes the debug user interface 128 and may pass the results to the debug user interface 128. Alternatively, the results may be passed to the results buffer 138 to cache data for the debug user interface 128. In other embodiments, the user may input a command while the computer program 120 is stopped, causing the debugger 124 to run a desired debugging routine. Result values are then provided to the user via the debug user interface 128.

Figure 4:
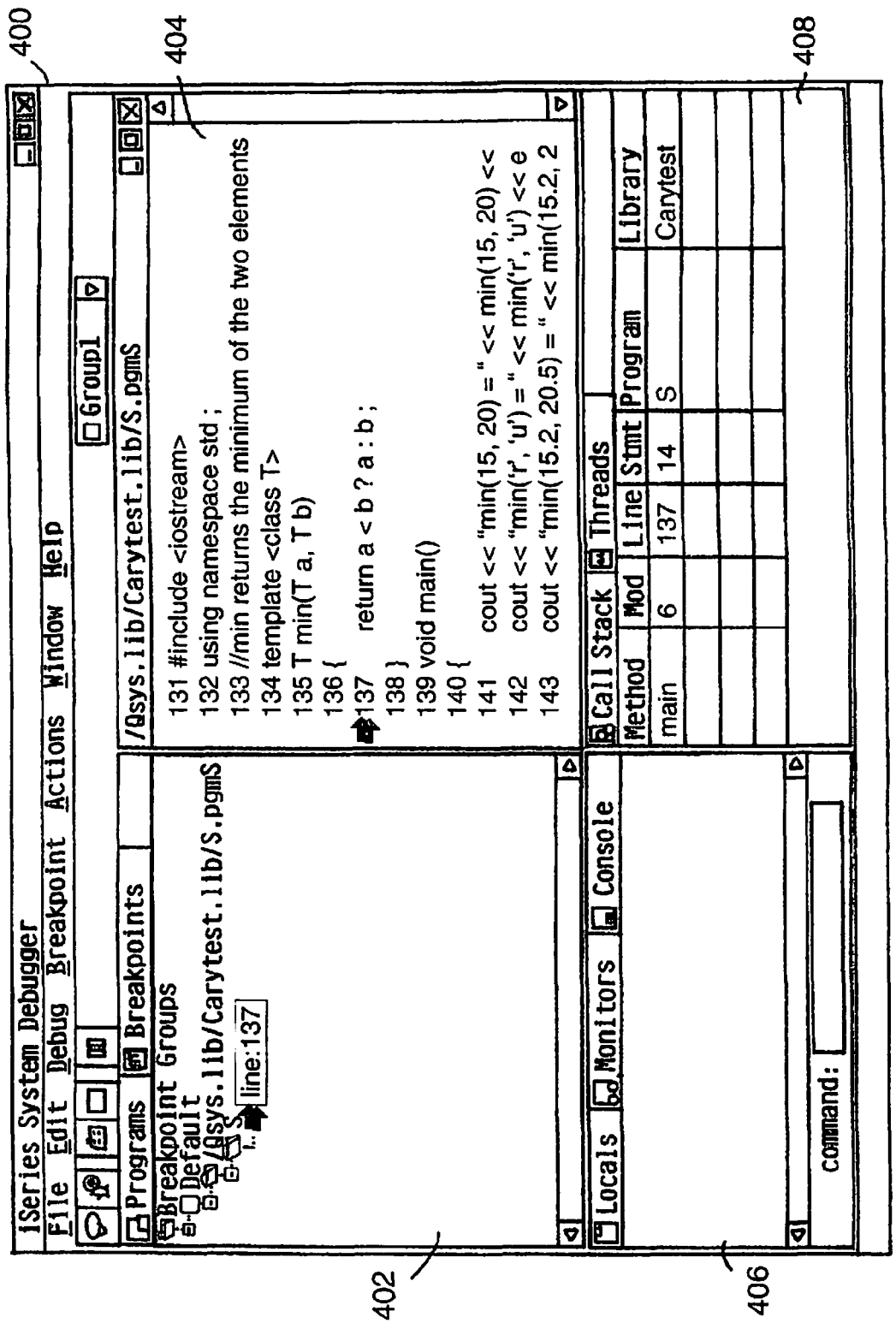
FIG. 4 illustrates an exemplary graphical user interface screen including "multiple breakpoints" icons in accordance with the preferred embodiments of the present invention.

Referring now to FIG. 4, an exemplary graphical user interface screen 400 of the debug user interface 128 including "multiple breakpoints" icons in accordance with the preferred embodiments of the present invention is illustrated. The graphical user interface screen 400 includes a breakpoint panel 402, a source code panel 404, a local variable panel 406, and a call stack panel 408.

In the exemplary graphical user interface screen 400 shown in FIG. 4, the breakpoint panel 402 contains a single breakpoint group—Default. The breakpoint panel 402 may contain one or more other breakpoint groups, e.g., Group1 (not shown), in addition to, or in lieu of, the Default breakpoint group.

In accordance with the preferred embodiments of the present invention, one or more "multiple breakpoints" icons (each "multiple breakpoints" icon is shown in FIG. 4 as a black double arrow) is/are displayed to indicate that multiple breakpoints are set in multiple expansions of a template. In the Default breakpoint group in the breakpoint panel 402, a multiple breakpoints icon indicates that a breakpoint is set in multiple expansions of the template on line 137 (as indicated by the black double arrow proximate line 137.

In this example, the source code panel 404 shows an exemplary C++ function template "min". However, the present invention is applicable to source code that involves the use of other kinds of templates, e.g., C++ class templates and C++ static data member templates, or other programming constructs for type parameterization.

The exemplary template function "min", which is described in more detail below, is shown at lines 131-138 in the source code panel 404. Lines 135-138 will be duplicated for each type passed into template function min. Uses of the template's routine (e.g. at line 141, line 142 and line 143) determine what expansions must be created, but it is lines 135-138 that will be expanded into a different routine for each use. As shown in FIG. 4, the multiple breakpoints icon only appears on line 137. One skill in the art will appreciate, however, that the multiple breakpoints icon may appear on any one or more of the duplicated lines (i.e., lines 135-138), assuming the debugger allowed the user/developer to set a breakpoint on those types of lines.

For a given multiple breakpoints icon, all breakpoints would be on the same line of the template. For example, one would be in the template expansion for int parameters, another would be set in the template expansion that handles floats, still another would be in the template expansion that handles chars, etc. But all these breakpoints would be on the same line of the common template source (e.g., line 137, or lines 135-138 in the exemplary function template).

In the breakpoint panel 402, line 137 is shown highlighted. This highlighting indicates that line 137 has been selected by a user/developer. For example, line 137 may have been selected for the purpose of setting a breakpoint at line 137 with the first click of an input device (e.g., mouse, TrackPoint, or the like) in accordance with the preferred embodiments of the present invention. The multiple breakpoints icon alerts the user/developer that a breakpoint is set in multiple expansions of the template on line 137 (e.g., breakpoints are set in multiple expansions of the template on line 137 shown in the breakpoint panel 402 and the source code panel 404, as described above). In addition, it is desirable to provide the user/developer with a breakpoint properties dialog box (discussed below with reference to FIG. 5) that provides information identifying all of the expansions in which the breakpoints are set.

Figure 5:
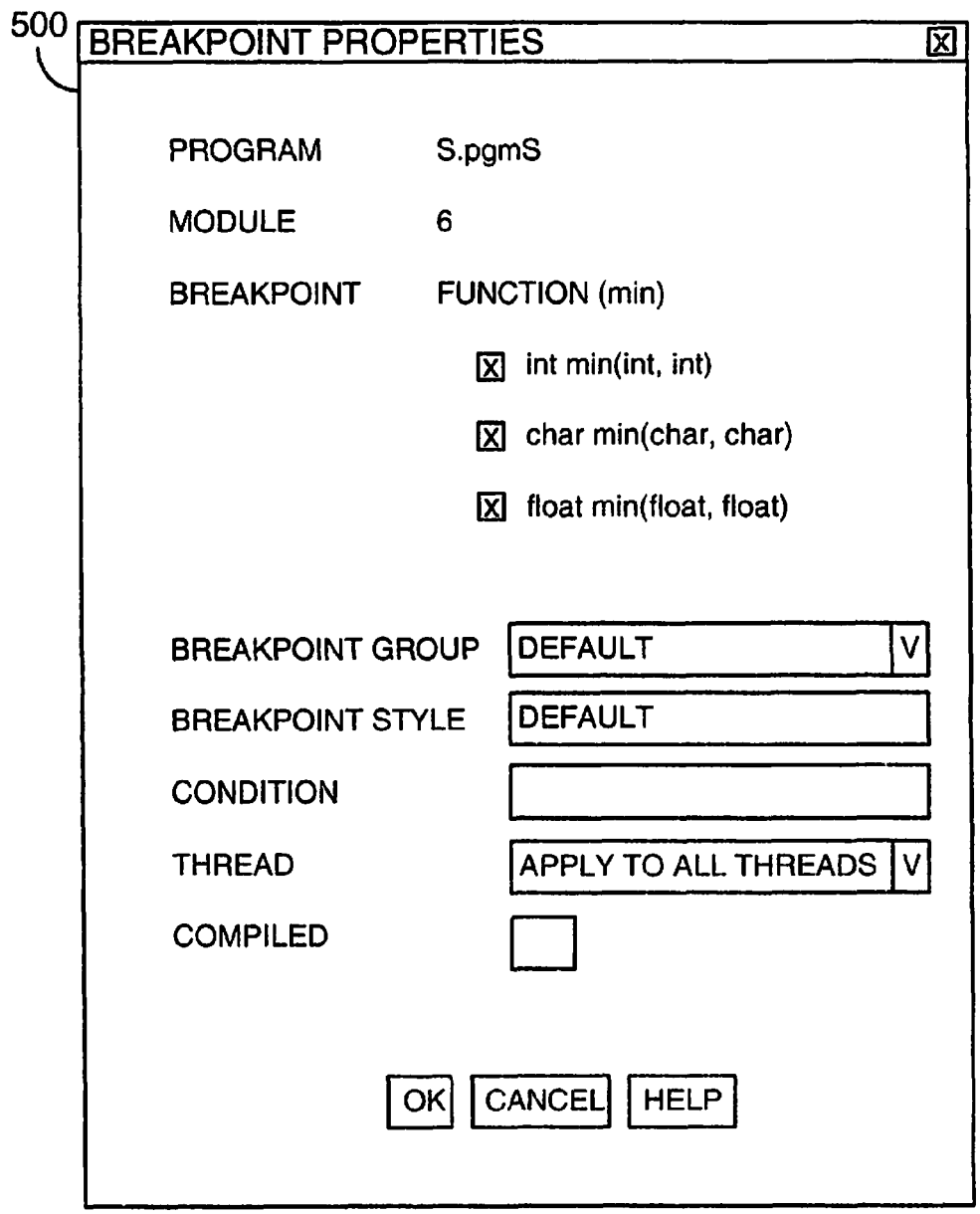
FIG. 5 illustrates an exemplary breakpoint properties dialog box in accordance with the preferred embodiments of the present invention.

Referring temporarily to FIG. 5, an exemplary breakpoint properties dialog box 500 in accordance with the preferred embodiments of the present invention is illustrated. Once alerted by the multiple breakpoints icon, the user/developer may request that the breakpoint properties dialog box be displayed by, for example, right-clicking on one of the multiple breakpoints icons. In the exemplary breakpoint properties dialog box 500 shown in FIG. 5, breakpoints are set in expansions of the template: int min(int, int); char min(char, char); and float min(float, float). Hence, one breakpoint is set in the template expansion for int parameters, another breakpoint is set in the template expansion for chars, and still another breakpoint is set in the template expansion that handles floats. One skilled in the art will appreciate that the template expansions may be represented in a breakpoint properties dialog box in any suitable manner, e.g., the template expansions may be listed using the C++ mangled form in lieu of, or in addition to, the non-mangled form shown in FIG. 5.

Referring back to FIG. 4, the source code panel 404 displays a portion of source code (e.g., line 131 through line 143 in the illustrative source code shown in FIG. 4). The portion of source code that is displayed in the source code panel 404 may, for example, be determined based on the breakpoint selected by a user/developer in the breakpoint panel 402.

Function templates are implemented like regular functions, except they are prefixed with the keyword template. In the source code panel 404 shown in FIG. 4, the function template "min" includes line 131 through line 138, as follows.

```
131 #include <iostream>
132 using namespace std;
133 //min returns the minimum of the two elements
134 template <class T>
135 T min(T a, T b)
136 {
137    return a < b ? a : b;
138 }
```

When the compiler 122 encounters an instantiation of the function template (e.g., the call min(15, 20) at line 141, the call min('r', 'u') at line 142, and the call min(15.2, 20.5) at line 143 in the function main), the compiler generates a function (e.g., min(int, int), min(char, char), and min(float, float). In the source code panel 404 shown in FIG. 4, the instantiations of the function template includes line 141, line 142 and line 143, as follows.

```
139 void main( )
140 {
141    cout << "min(15, 20) = " << min(15, 20) << endl ;
142    cout << "min('r', 'u') = " << min('r', 'u') << endl ;
143    cout << "min(15.2, 20.5) = " << min(15.2, 20.5) << endl ;
```

For purposes of illustration, these instantiations of the template respectively provide a program output, as follows.

```
min(15, 20) = 15
min('r', 'u') = r
min(15.2, 20.5) = 15.2
```

Figure 6:
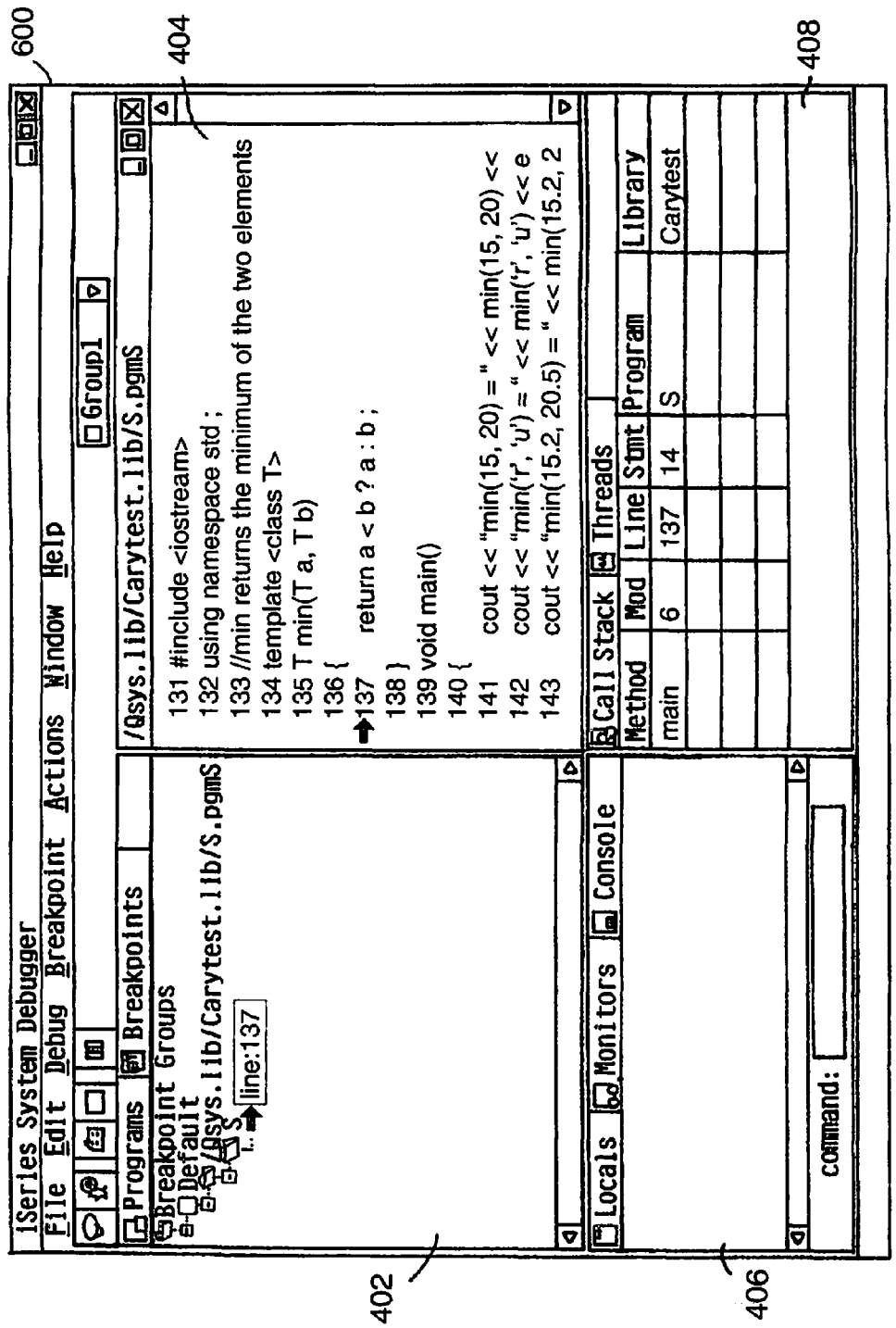
FIG. 6 illustrates an exemplary graphical user interface screen including a "single breakpoint" icon in accordance with the preferred embodiments of the present invention.

FIG. 6 illustrates an exemplary graphical user interface screen 600 including a "single breakpoint" icon in accordance with the preferred embodiments of the present invention. A single breakpoint icon indicates that a breakpoint is set in an expansion of the template on line 137 (as indicated by the black single arrow proximate line 137). In response to a second click of the input device, the multiple breakpoints icon (shown in FIG. 4) is removed from display, a breakpoint is set in only the current expansion of the template that is active in the call stack (e.g., line 137 as shown in the call stack panel 408), and a single breakpoint icon is displayed. The user/developer may, for example, left-click one of the multiple breakpoints icons to toggle to the single breakpoint icon in accordance with the preferred embodiments of the present invention. In lieu of or in addition to toggling from the multiple breakpoints icons to the single breakpoint icon, the user/developer may select one or more of the expansions of the template at which to set a breakpoint using the selection boxes in the breakpoint properties dialog box 500 (FIG. 5).

In response to the third click of the input device, the breakpoint is removed and the single breakpoint icon is removed from display. The user/developer may, for example, left-click the single breakpoint icon to toggle out of the breakpoint altogether in accordance with the preferred embodiments of the present invention.

In lieu of or in addition to toggling from multiple breakpoints, to a single breakpoint, and then to no breakpoint, the user/developer may move among these breakpoint options through any suitable selection mechanism, such as a context menu or other dialog box.

Figure 7:
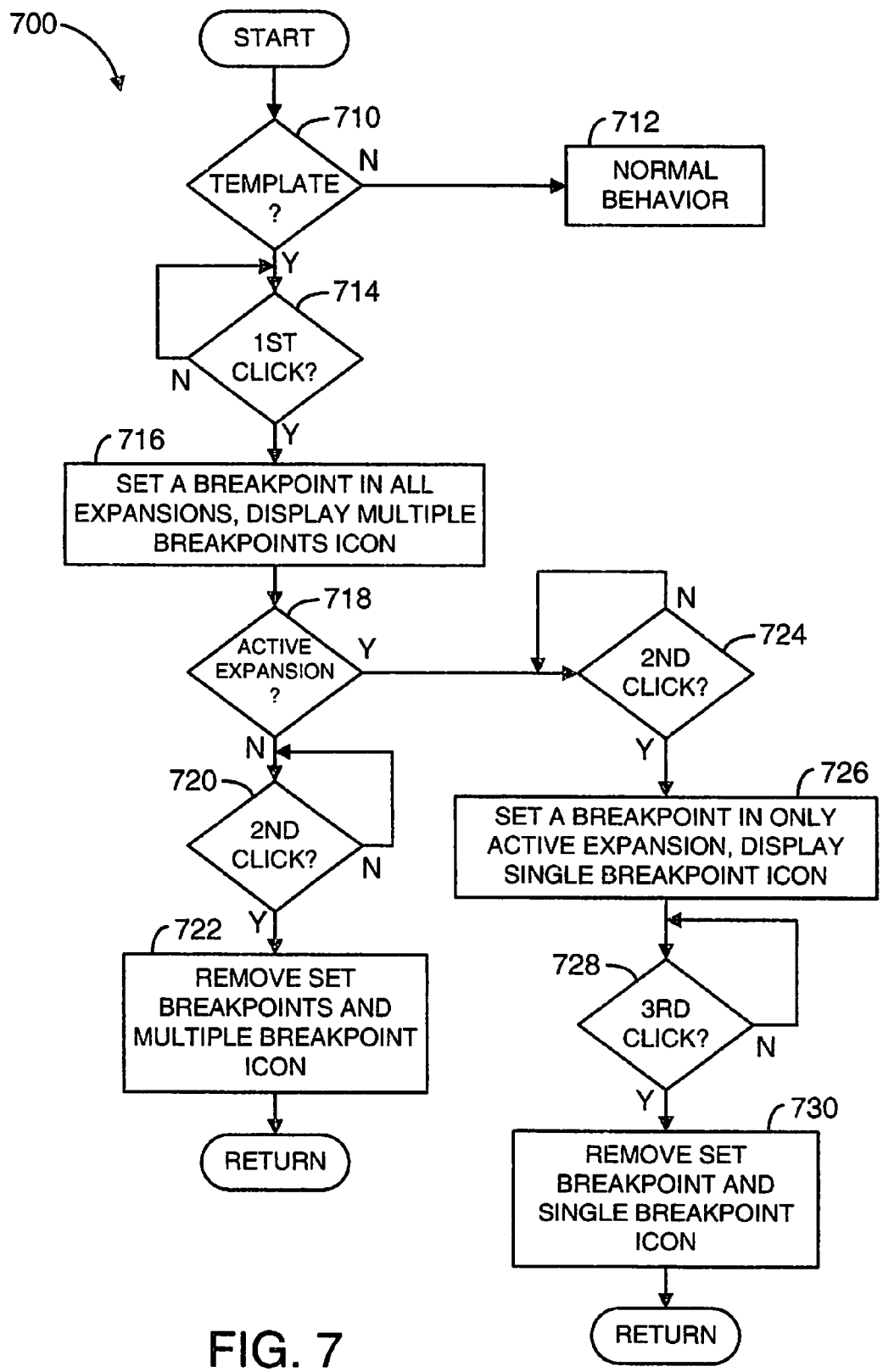
FIG. 7 is a flow diagram illustrating a method for implementing enhanced template debug in accordance with the preferred embodiments of the present invention.

FIG. 7 is a flow diagram illustrating a method 700 for implementing enhanced template debug in accordance with the preferred embodiments of the present invention. In the method 700, the steps discussed below (steps 710-730) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 700 begins with the enhanced template debug mechanism 126 determining whether the code of to be examined, edited, compiled and/or debugged, e.g., computer program 120, includes a template (step 710). If the enhanced template debug mechanism determines that the code does not include a template (step 710=No), the method 700 continues with the debugger 124 exhibiting conventional behavior (step 712). Typical of this conventional behavior, a first click of an input device by a user/developer sets a single breakpoint and a second click removes the set breakpoint.

If the enhanced template debug mechanism determines that the code includes a template (step 710=Yes), the method 700 continues with the enhanced template debug mechanism determining whether a first click of an input device has been received (step 714). If the enhanced template debug mechanism determines that a first click of the input device has not been received (step 714=No), the method 700 repeats step 714. If the enhanced template debug mechanism determines that a first click of the input device has been received (step 714=Yes), the method 700 continues with the enhanced template debug mechanism setting a breakpoint in each expansion of the template and displaying a multiple breakpoints icon (step 716). For example, one or more multiple breakpoints icons may be displayed in a breakpoint panel and/or a source code panel of a graphical user interface screen.

The multiple breakpoints icon displayed in step 716 gives the user notice that the breakpoint will fire in multiple template expansions. Preferably, the user may request display of a breakpoint properties dialog box listing the expansions in which the multiple breakpoints are set. For example, step 716 may include displaying a breakpoint properties dialog box, such as the breakpoint properties dialog box 500 (FIG. 5), atop a portion of a breakpoint panel and/or a source code panel of a graphical user interface screen in response to a right-click of the input device. Preferably, the user/developer may request display of the breakpoint properties dialog box at any time during method 700 so that he/she may ascertain in which expansions of the template the breakpoint will or will not fire.

After setting a breakpoint in each expansion of the template and displaying the multiple breakpoints icon at step 716, the method 700 continues with the enhanced template debug mechanism determining whether an expansion of the template is active in the call stack (step 718). If the enhanced template debug mechanism determines that no expansion of the template is active in the call stack (step 718=No), the method 700 continues with the enhanced template debug mechanism determining whether a second click of the input device has been received (step 720). If the enhanced template debug mechanism determines that a second click of the input device has not been received (step 720=No), the method 700 repeats step 720. If the enhanced template debug mechanism determines that a second click of the input device has been received (step 720=Yes), the method 700 continues with the enhanced template debug mechanism removing the breakpoints set in step 716 and removing the multiple breakpoints icon displayed in step 716 (step 722). After step 722 the click count is reset to zero and the method 700 returns (so that the method 700 may be repeated).

If the enhanced template debug mechanism determines that an expansion of the template is active in the call stack (step 718=Yes), the method continues with the enhanced template debug mechanism determining whether a second click of the input device has been received (step 724). If the enhanced template debug mechanism determines that a second click of the input device has not been received (step 724=No), the method 700 repeats step 724. If the enhanced template debug mechanism determines that a second click of the input device has been received (step 724=Yes), the method 700 continues with the enhanced template debug mechanism setting a breakpoint in only a current expansion that is active on the call stack and displaying a single breakpoint icon (step 726). For example, one or more single breakpoint icons may be displayed in a breakpoint panel and/or a source code panel of a graphical user interface screen. Step 726 may be accomplished, for example, by initially removing the breakpoints set at step 716 and the multiple breakpoints icon displayed at step 716, and then setting the breakpoint in the active expansion and displaying the single breakpoint icon.

The method 700 continues with the enhanced template debug mechanism determining whether a third click of the input device has been received (step 728). If the enhanced template debug mechanism determines that a third click of the input device has not been received (step 728=No), the method 700 repeats step 728. If the enhanced template debug mechanism determines that a third click of the input device has been received (step 728=Yes), the method 700 continues with the enhanced template debug mechanism removing the single breakpoint set in step 726 and removing the single breakpoints icon displayed in step 726 (step 730). After step 730 the click count is reset to zero and the method 700 returns (so that the method 700 may be repeated).

One skilled in the art will appreciate that many variations are possible within the scope of the present invention. Thus, while the present invention has been particularly shown and described with reference to preferred embodiments thereof, it will be understood by those skilled in the art that changes in form and details may be made therein without departing from the spirit and scope of the present invention.

What is claimed is:

1. A computer-implemented method, performed by a debugging program, for executing an operation on at least one breakpoint within a program, comprising the steps of:
   receiving a selection to execute the operation, wherein the program includes a template;
   in response to a first selection, setting a breakpoint in all expansions of the template and displaying a multiple breakpoints icon indicating that multiple breakpoints are set on multiple expansions of the template;
   determining whether or not an expansion of the template is active in a call stack;
   responding to one or more subsequent selections based on the determining step, wherein the responding step includes:
      upon determining that an expansion of the template is active in the call stack, performing the steps of:
         in response to a second selection, setting a breakpoint in only a single expansion of the template that is active in the call stack, removing the multiple breakpoints icon, and displaying a single breakpoint icon indicating that a breakpoint is set in a single expansion of the template; and
         in response to a third selection, removing any breakpoint set in any expansion of the template and removing the single breakpoint icon; or
      upon determining that an expansion of the template is not active in the call stack, performing the step of:
         in response to a second selection, removing any breakpoint set in any expansion of the template and removing the multiple breakpoints icon.

2. The computer-implemented method as recited in claim 1, wherein setting a breakpoint in only a single expansion of the template that is active in the call stack in response to the second selection comprises:
   removing the breakpoints set in response to the first selection;
   setting a breakpoint in only a current expansion that is active on the call stack.

3. The computer-implemented method as recited in claim 1, wherein the first selection is made by a user with a single click of an input device, the second selection is made by the user with another single click of the input device, and the third selection is made by the user with still another single click of the input device.

4. The computer-implemented method as recited in claim 1, further comprising the steps of:
   receiving a properties dialog box request;
   in response to the properties dialog box request, displaying a breakpoint properties dialog box listing each of the expansions of the template in which the multiple breakpoints are set.

5. A data processing system, comprising:
   a processor;
   a memory coupled via a bus to the processor, the memory containing a debugging program for debugging a program, the debugging program being encoded with instructions that when executed by the processor comprise the steps of:
      receiving a selection to execute an operation on at least one breakpoint within the program, wherein the program includes a template;
      in response to a first selection, setting a breakpoint in all expansions of the template and displaying a multiple breakpoints icon indicating that multiple breakpoints are set on multiple expansions of the template;
      determining whether or not an expansion of the template is active in a call stack:
      responding to one or more subsequent selections based on the determining step, wherein the responding step includes:
         upon determining that an expansion of the template is active in the call stack, performing the steps of:
            in response to a second selection, setting a breakpoint in only a single expansion of the template that is active in the call stack, removing the multiple breakpoints icon, and displaying a single breakpoint icon indicating that a breakpoint is set in a single expansion of the template; and
            in response to a third selection, removing any breakpoint set in any expansion of the template and removing the single breakpoint icon; or
         upon determining that an expansion of the template is not active in the call stack, performing the step of:
            in response to a second selection, removing any breakpoint set in any expansion of the template and removing the multiple breakpoints icon.

6. The data processing system as recited in claim 5, wherein setting a breakpoint in only a single expansion of the template that is active in the call stack in response to the second selection comprises:
   removing the breakpoints set in response to the first selection;
   setting a breakpoint in only a current expansion that is active on the call stack.

7. The data processing system as recited in claim 5, wherein the first selection is made by a user with a single click of an input device, the second selection is made by the user with another single click of the input device, and the third selection is made by the user with still another single click of the input device.

8. The data processing system as recited in claim 5, wherein the debugging program is encoded with instructions that when executed by the processor further comprise the steps of:
   receiving a properties dialog box request;
   in response to the properties dialog box request, displaying a breakpoint properties dialog box listing each of the expansions of the template in which the multiple breakpoints are set.

9. A computer program product for debugging a program in a digital computing device having at least one processor, comprising:
   a plurality of executable instructions provided on non-transitory computer readable storage media, wherein the executable instructions, when executed by the at least one processor, cause the digital computing device to perform an operation on at least one breakpoint within the program, comprising the steps of:
      receiving a selection to execute the operation, wherein the program includes a template;
      in response to a first selection, setting a breakpoint in all expansions of the template and displaying a multiple breakpoints icon indicating that multiple breakpoints are set on multiple expansions of the template;
      determining whether or not an expansion of the template is active in a call stack;
      responding to one or more subsequent selections based on the determining step, wherein the responding step includes:

upon determining that an expansion of the template is active in the call stack, performing the steps of:
- in response to a second selection, setting a breakpoint in only a single expansion of the template that is active in the call stack, removing the multiple breakpoints icon, and displaying a single breakpoint icon indicating that a breakpoint is set in a single expansion of the template; and
- in response to a third selection, removing any breakpoint set in any expansion of the template and removing the single breakpoint icon; or upon determining that an expansion of the template is not active in the call stack, performing the step of:
- in response to a second selection, removing any breakpoint set in any expansion of the template and removing the multiple breakpoints icon.

10. The computer program product as recited in claim 9, wherein setting a breakpoint in only a single expansion of the template that is active in the call stack in response to the second selection comprises:

removing the breakpoints set in response to the first selection;

setting a breakpoint in only a current expansion that is active on the call stack.

11. The computer program product as recited in claim 9, wherein the first selection is made by a user with a single click of an input device, the second selection is made by the user with another single click of the input device, and the third selection is made by the user with still another single click of the input device.

12. The computer program product as recited in claim 9, wherein the executable instructions, when executed by the at least one processor, further comprise the steps of:

receiving a properties dialog box request;

in response to the properties dialog box request, displaying a breakpoint properties dialog box listing each of the expansions of the template in which the multiple breakpoints are set.

* * * * *